(12) United States Patent
Lu

(10) Patent No.: US 8,326,375 B2
(45) Date of Patent: *Dec. 4, 2012

(54) METHOD AND APPARATUS FOR REDUCING STANDBY POWER CONSUMPTION OF A HANDHELD COMMUNICATION SYSTEM

(75) Inventor: Paul Lu, Los Altos, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/246,632

(22) Filed: Sep. 27, 2011

(65) Prior Publication Data

US 2012/0052928 A1    Mar. 1, 2012

Related U.S. Application Data

(63) Continuation of application No. 12/427,346, filed on Apr. 21, 2009, now Pat. No. 8,027,707, which is a continuation of application No. 11/135,919, filed on May 23, 2005, now Pat. No. 7,522,941.

(51) Int. Cl.
*H04M 1/00* (2006.01)

(52) U.S. Cl. ............. 455/574; 455/127.1; 455/343.4; 455/522; 713/324; 320/133

(58) Field of Classification Search ......... 455/127.1, 455/127.5, 343.1–343.4, 522, 550.1, 572–574; 713/320–324; 320/132, 133
See application file for complete search history.

(56) References Cited

U.S. PATENT DOCUMENTS

| | | | |
|---|---|---|---|
| 5,148,546 A | 9/1992 | Blodgett | |
| 5,423,045 A | 6/1995 | Kannan et al. | |
| 5,627,412 A | 5/1997 | Beard | |
| 6,345,180 B1 * | 2/2002 | Reichelt | 455/404.1 |
| 6,356,538 B1 | 3/2002 | Li | |
| 6,785,564 B1 | 8/2004 | Quigley et al. | |
| 6,799,030 B2 * | 9/2004 | Barber et al. | 455/343.1 |
| 6,845,246 B1 | 1/2005 | Steer | |
| 7,072,697 B2 | 7/2006 | Lappetelainen et al. | |
| 7,310,535 B1 | 12/2007 | MacKenzie et al. | |
| 7,313,419 B2 | 12/2007 | Islam et al. | |
| 7,522,941 B2 * | 4/2009 | Lu | 455/574 |
| 8,027,707 B2 * | 9/2011 | Lu | 455/574 |
| 2001/0044332 A1 * | 11/2001 | Yamada et al. | 455/574 |

(Continued)

FOREIGN PATENT DOCUMENTS

EP       1422596      5/2004

(Continued)

*Primary Examiner* — Nhan Le
(74) *Attorney, Agent, or Firm* — Sterne, Kessler, Goldstein & Fox P.L.L.C.

(57) ABSTRACT

A method for managing operation of a device, the method including performing using one or more processors and/or circuits in a handheld device, the one or more processors and/or circuits including a control device and one or more other devices, functions including receiving from the control device, one or more power setting signals indicative of a desired power level setting. The handheld device may operate utilizing a NORMAL power level setting in a normal mode, or a standby power level setting in standby mode. The standby power level setting may include a LOW power level setting and a sleep mode setting. One or more corresponding power adjustment signals may be generated based on the received one or more power setting signals. Power supplied to the handheld device may be adjusted based on the generated one or more corresponding power adjustment signals.

27 Claims, 6 Drawing Sheets

U.S. PATENT DOCUMENTS

| | | |
|---|---|---|
| 2002/0025839 A1 | 2/2002 | Usui |
| 2003/0104849 A1 | 6/2003 | Arimitsu |
| 2004/0148533 A1 | 7/2004 | Nicholas |
| 2004/0199803 A1 | 10/2004 | Suzuki et al. |
| 2004/0259542 A1 | 12/2004 | Viitamaki et al. |
| 2005/0223254 A1 | 10/2005 | Watts, Jr. |
| 2005/0258806 A1 | 11/2005 | Janik et al. |
| 2006/0143483 A1 | 6/2006 | Liebenow |

FOREIGN PATENT DOCUMENTS

| | | |
|---|---|---|
| WO | 200133870 A2 | 5/2001 |
| WO | 2005034546 A1 | 4/2005 |

* cited by examiner

METHOD AND APPARATUS FOR REDUCING STANDBY POWER CONSUMPTION OF A HANDHELD COMMUNICATION SYSTEM

RELATED APPLICATIONS

This application is a continuation of U.S. patent application Ser. No. 12/427,346 filed Apr. 21, 2009 which is a continuation of U.S. patent application Ser. No. 11/135,919 (now U.S. Pat. No. 7,522,941) filed May 23, 2005.

FEDERALLY SPONSORED RESEARCH OR DEVELOPMENT

[Not Applicable]

MICROFICHE/COPYRIGHT REFERENCE

[Not Applicable]

FIELD OF THE INVENTION

Certain embodiments of the invention relate to power consumption in electronic circuits. More specifically, certain embodiments of the invention relate to a method and apparatus for reducing standby power consumption of a handheld communication system.

BACKGROUND OF THE INVENTION

Mobile communication systems such as cellular telephones, personal digital assistants (PDAs), and handheld systems are now required to perform more sophisticated communication functions with multiple networks, as well as multimedia functions. For example, a multistandard wireless communication device, such as a cellular handset, may comprise a Bluetooth device for wireless PAN (personal area network) communication, a Wi-Fi device for wireless LAN (local area network) communication, and/or an application processor for playing music and capturing video.

Multistandard wireless communication systems may be adapted to operate in sleep mode and in normal mode. The standby period of operation may take most of the ON time. During a standby period of operation, the multistandard wireless communication system may only need wake up periodically to check incoming calls, for example, and may operate in sleep mode for the rest time. Most conventional multistandard wireless communication systems do not control power consumption in standby periods.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for reducing standby power consumption of a handheld communication system, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain aspects of the invention may be found in a method and system for managing power consumption within an exemplary multistandard wireless communication system. For example, standby power consumption for a device in LOW power or sleep mode within the multistandard wireless communication system may be further reduced by lowering a voltage and/or current supplied to the device below a voltage and/or current normally used for wake-up mode. In this regard, the voltage that is normally used while operating in a LOW power mode is further reduced to a level where the device is still allowed to operate properly all sleep mode functions.

In one embodiment of the invention, the handheld multistandard communication system may be adapted to receive a power setting signal from a control device integrated within the handheld multistandard communication system. The received power setting signal may indicate a desired power level setting. In accordance with the received power setting signal, power supplied to at least one device within the handheld multistandard communication system may be adjusted based on a generated power adjustment signal. The power adjustment signal may control the power supplied to the devices within the handheld multistandard communication system.

The adjustment of the power supplied to one or more devices within the handheld multistandard communication system may correspond to one or more power level settings. The power level settings may comprise a NORMAL operating power level setting and/or a LOW power level setting. The power setting signal indicative of the desired power level setting may be acquired from the device within the handheld multistandard communication system. A current to the device within the handheld multistandard communication system may be limited based on the desired power level setting.

Figure 1A:
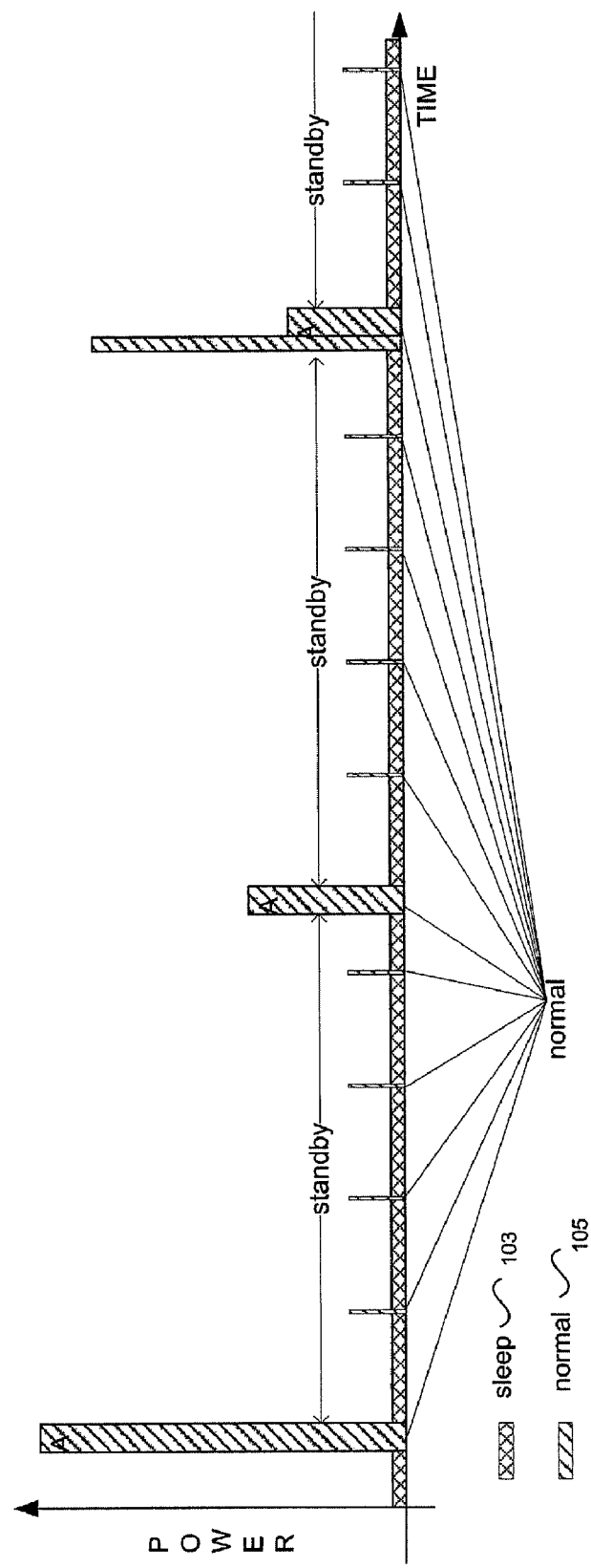
FIG. 1A is an exemplary turning diagram illustrating power consumption during standby and normal operating mode, in accordance with an embodiment of the invention.

FIG. 1A is an exemplary timing diagram illustrating power consumption during standby and normal operating mode, in accordance with an embodiment of the invention. Referring to FIG. 1A, an exemplary multistandard wireless communication system may operate for brief periods of time in normal mode 105. During such operation in normal mode, a user of the multistandard wireless communication system, such as a handheld system, may be conducting a telephone conversation or downloading and processing email, for example. During an exemplary standby period of operation, the multistandard wireless communication system may be mostly in sleep mode 103, as illustrated in FIG. 1A. Since the standby period of operation may take most of the ON time of the exemplary multistandard wireless communication system, an effective control of the power consumption in the standby periods may significantly prolong the battery life time of a handheld communication system.

Figure 1B:
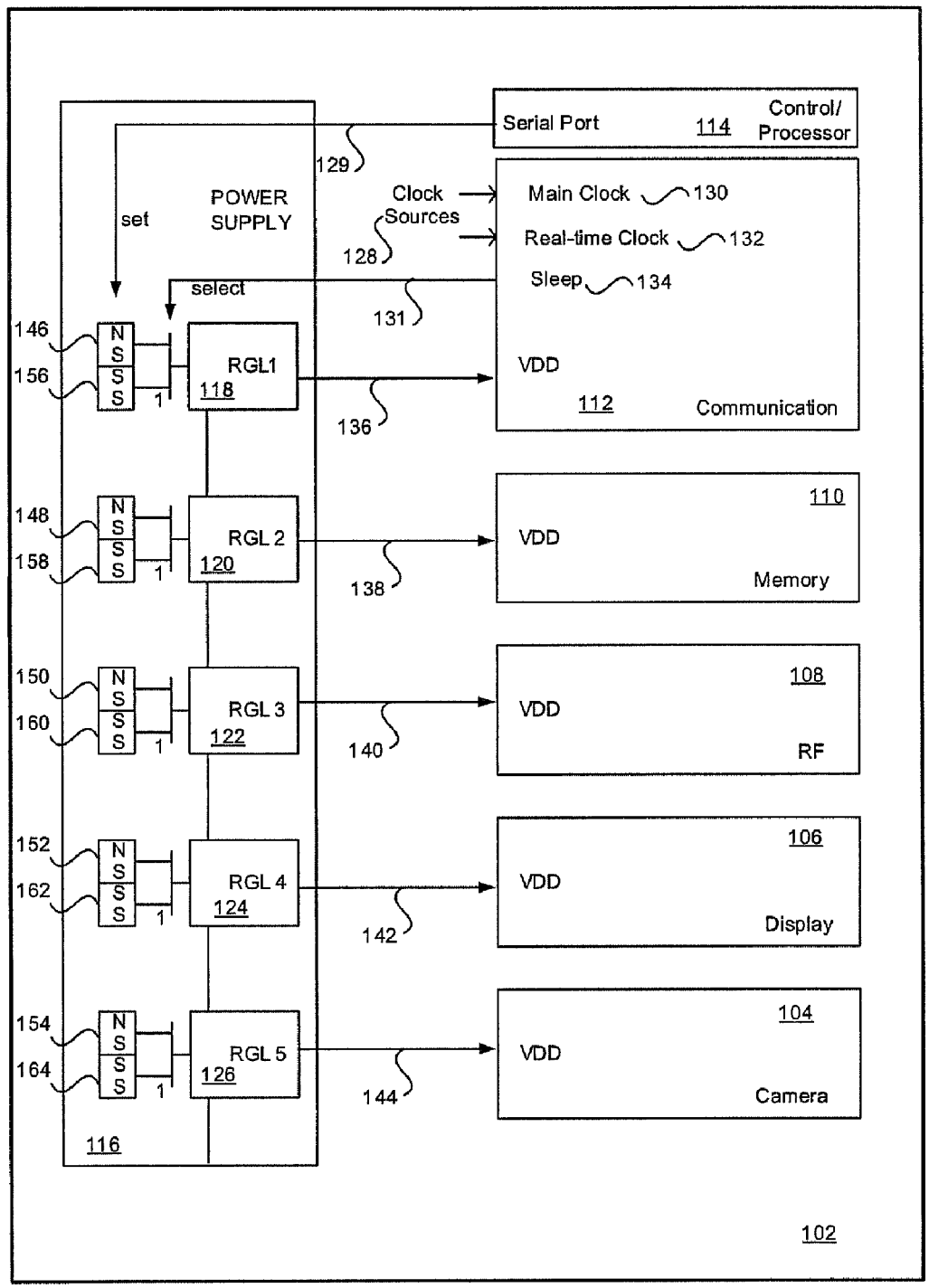
FIG. 1B is a block diagram of an exemplary multistandard wireless communication system utilizing reduced standby power consumption, in accordance with an embodiment of the invention.

FIG. 1B is a block diagram of an exemplary multistandard wireless communication system utilizing reduced standby power consumption, in accordance with an embodiment of the invention. Referring to FIG. 1B, the multistandard wireless communication system 102 may comprise a plurality of devices, such as a power supply 116, a control module 114, a communication module 112, memory 110, a radio frequency (RF) block 108, display 106, and camera 104. Each of the devices within the multistandard wireless communication system 102 may be characterized with separate voltage and current requirements, as well as ON and OFF times of operation during which a device is turned ON and OFF, respectively.

The control module 114 may comprise suitable circuitry, logic, and/or code and may be adapted to provide one or more power setting signals 129 to the power supply 116. The power setting signals 129 supplied by the control module 114 may be indicative of a power level setting utilized by the power supply 116. For example, the control module 114 may communicate a power setting signal 129 for programming an output voltage of the power supply 116. The control module 114 may communicate power setting signals 129 to the power supply 116 via a serial port, for example. In one aspect of the invention, the control module 114 may comprise a central processing unit (CPU), microcontroller or other type of processor.

The communication module 112 may comprise suitable circuitry, logic, and/or code and may be adapted to communicate one or more power adjustment signals 131 for adjusting power supplied by the power supply 116 to one or more devices within the multistandard wireless communication system 102. The communication module 112 may be further adapted to receive a main clock signal 130 and a real-time clock signal 132 from clock signal sources 128. The communication module 112 may also comprise a sleep timer 134.

The power adjustment signal 131 communicated by the communication module 112 to the power supply 116 may result in a LOW or NORMAL power level voltage supplied to one or more devices within the multistandard wireless communication system 102. The LOW power level voltage may be indicative of a sleep mode of operation and the NORMAL power level voltage may be indicative of a normal mode of operation for the signal receiving device within the multistandard wireless communication system 102.

The main clock signal 130 received by the communication module 112 may be utilized for clocking the devices within the multistandard wireless communication system 102 during a normal mode of operation. The real-time clock signal 132 may be utilized for clocking the devices within the multistandard wireless communication system 102 during a sleep mode of operation. The sleep timer 134 may be utilized for timing duration in which one or more of the devices within the multistandard wireless communication system 102 are operating in standby mode. In one embodiment of the invention, the power adjustment signal 131 may cause the power supply to select a NORMAL power voltage level output when the sleep timer 134 is inactive and a LOW power voltage level output when the sleep timer 134 is active.

The RF module 108 may comprise suitable circuitry, logic, and/or code and may be adapted to process RF signals received by the multistandard wireless communication system 102 and/or RF signals prior to transmission by the multistandard wireless communication system 102.

The display 106 and the camera 104 may be adapted to provide display and camera capabilities, respectively, within the multistandard wireless communication system 102.

The power supply 116 may comprise regulator modules 118, . . . , 126, normal setting registers 146, . . . , 154, and sleep setting registers 156, . . . , 164. Each of the regulator modules 118, . . . , 126 may comprise suitable circuitry, logic, and/or code and may be adapted to supply LOW power level voltage for sleep mode of operation and/or NORMAL power level voltage for normal mode of operation to a device within the multistandard wireless communication system 102, upon receipt of the power adjustment signal 131. For example, regulator modules 118, . . . , 126 may be adapted to supply a voltage to the communication module 112, memory 110, the RF block 108, the display 106, and the camera 104, respectively, utilizing connections 136, . . . , 144.

The regulator modules 118, . . . , 126 may utilize the normal setting registers 146, . . . , 154, respectively, to store a value indicative of a NORMAL power level voltage for use by the corresponding regulator during normal mode of operation. Similarly, the regulators 118, . . . , 126 may utilize the sleep setting registers 156, . . . , 164, respectively, to store a value indicative of a LOW power level voltage for use by the corresponding regulator during standby or sleep mode of operation.

Even though the registers 146, . . . , 154 and 156, . . . , 164 are illustrated as being separate from the memory 110, the present invention may not be so limited. In this regard, the registers 146, . . . , 154 and 156, . . . , 164 may be part of the memory 110 within the multistandard wireless communication system 102. Further, the memory 110 may be utilized to store code that controls the reduction of standby power consumption within the multistandard wireless communication system 102.

In operation, the control module 114 may communicate power setting signals 129 to each of the regulator modules 118, . . . , 126. The power setting signals 129 may program each of the normal setting registers 146, . . . , 154 with corresponding NORMAL power level voltage settings supplied by the regulator modules 118, . . . , 126 to the devices 112, 110, 108, 106, and 104, respectively, during normal mode of operation. Similarly, the power setting signals 129 may program each of the sleep setting registers 156, . . . , 164 with corresponding LOW power level voltage settings supplied by the regulator modules 118, . . . , 126 to the devices 112, 110, 108, 106, and 104, respectively, during sleep mode of operation.

In one embodiment of the invention, after the multistandard wireless communication system 102 is turned ON, the devices within the multistandard wireless communication system 102 may operate in sleep mode and may switch to normal mode for a brief period of time. For example, devices within the multistandard wireless communication system 102 may switch to normal mode of operation after the sleep timer 134 times out to check the network traffic for an incoming call, before switching back to sleep mode of operation.

During an exemplary sleep mode of operation, the clock sources 128 may supply the real-time clock signal 132 to the communication module 112. The sleep timer 134 may be utilized to time the duration of the sleep mode of operation. The real-time clock signal may be utilized to clock one or more real-time timers within the multistandard wireless communication system 102. The regulator modules 118, . . . , 126 may each supply LOW power voltage to a corresponding device within the multistandard wireless communication system 102, based on the LOW power voltage setting stored in each sleep setting register 156, . . . , 164. The devices within the multistandard wireless communication system 102 may switch out of sleep mode of operation when the sleep timer 134 times out or expires.

During an exemplary normal mode of operation, the clock sources 128 may supply main clock signals 130 to the communication module 112. The regulator modules 118, . . . , 126 may each supply NORMAL power voltage to a corresponding device within the multistandard wireless communication system 102, based on the NORMAL power voltage setting stored in each normal setting register 146, . . . , 154. The devices within the multistandard wireless communication system 102 may switch out of normal mode of operation when the sleep timer 134 is reset for timing a new duration for sleep mode of operation.

Power consumption P within the multistandard wireless communication system 102 may be represented by the equation $P=CV_s^2 f + V_s I_q$, with $V_s$ being the supply voltage, C being the capacitive load, f being the clock frequency, and $I_q$ being the leakage current. In instances where the supply voltage is lowered by 30%, for example, in sleep mode, the first term will be $C(0.7V_s)^2 f = 0.49 CV_s^2 f$, which may represent a 50% saving in power. In addition, lowering $V_s$ may also reduce $I_q$ of the second term. In an exemplary embodiment of the invention, total power consumed within the multistandard wireless communication system 102 may be significantly reduced by reducing the supply voltage to the devices within the multistandard wireless communication system 102 while the devices operate in sleep mode. In this regard, the reduced power consumption in the standby mode may result in a significant increase in the life of a battery used by the multistandard wireless communication system 102.

Power consumption by each of the regulator modules 118, . . . , 126 may be proportional to the regulator current capacity. For example, if a regulator module is adapted to supply a maximum of 150 mA, the regulator module may consume 100 uA. But in instances where the regulator module is adapted to supply a maximum of 1 mA, for example, the regulator module may consume 10 uA. In another aspect of the invention, to decrease overall power consumption within the multistandard wireless communication system 102, the current capacity for each regulator module within the multistandard wireless communication system 102 may be reduced during sleep mode of operation.

In an exemplary embodiment of the invention, each of the regulator modules 118, . . . , 126 may utilize two sets of voltage level and current capacity setting, one for wake-up, or normal, mode of operation and one for sleep mode of operation. The two sets of voltage and current information may be stored in the normal setting registers 146, . . . , 154, and the sleep setting registers 156, . . . , 164, respectively. The voltage level and current capacity for sleep mode of operation may be significantly reduced to levels sufficient to power up only a limited portion of the circuitry within the multistandard wireless communication system 102, such as real-time timers, for example. In this regard, the communication module 112 may utilize the sleep timer 134 and may be adapted to maintain a schedule of wake-up and sleep times for one or more devices within the multistandard wireless communication system 102.

The communication module may communicate the power adjustment signal 131 to the power supply 116. The power supply 116 may utilize the power adjustment signal 131 to select between a NORMAL or LOW power level setting for output voltage and regulator module current capacity, for a normal or standby mode of operation. The power adjustment signal 131 may effectuate the operating mode change promptly so that sleep time duration may be maximized. The time duration necessary for the normal power supply to settle may be programmable. The multistandard wireless communication system 102 may be adapted to enable the internal normal operation after the settling time.

Figure 2:
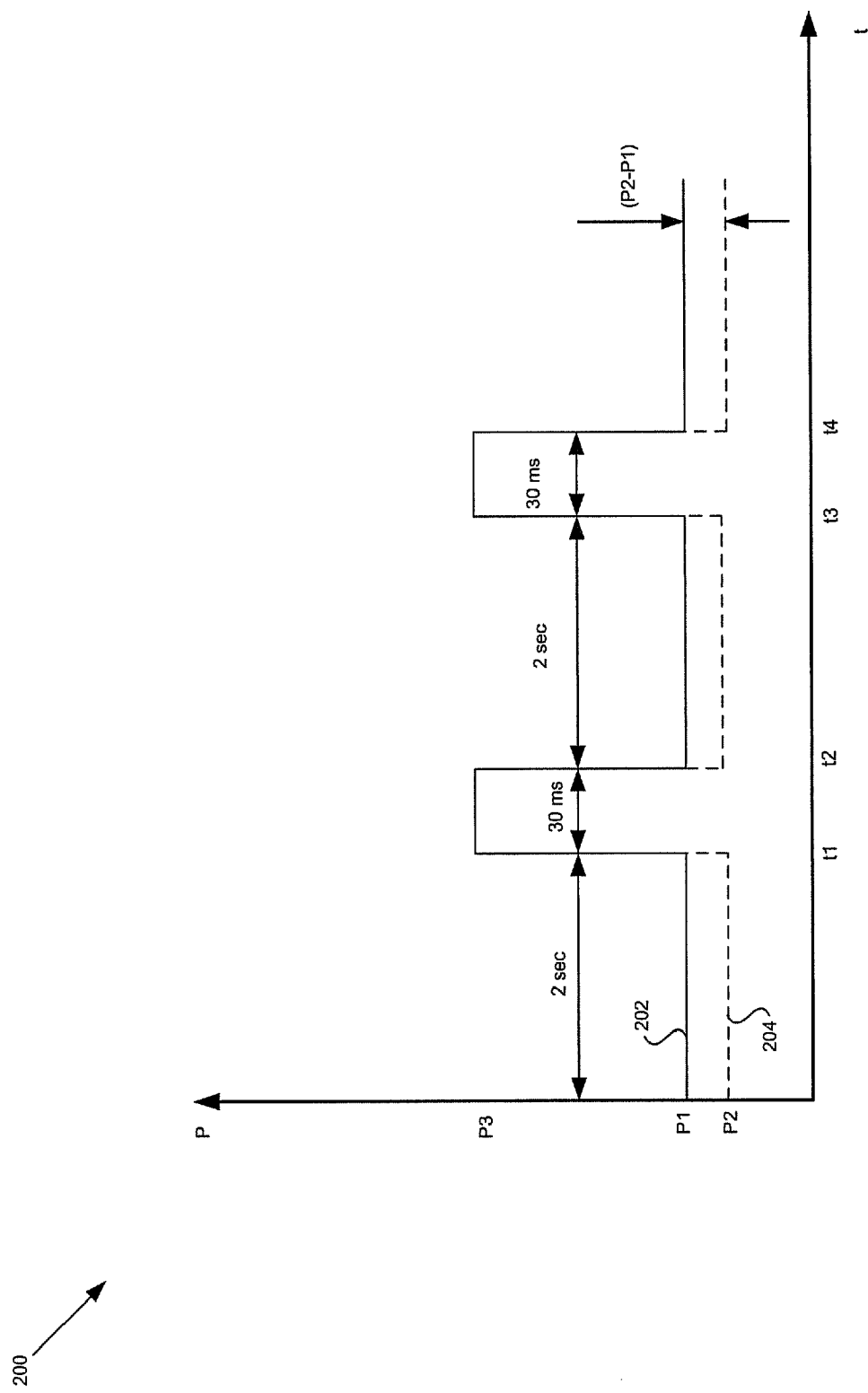
FIG. 2 is an exemplary timing diagram illustrating NORMAL power level operation and LOW power level operation of an exemplary multistandard wireless communication system, in accordance with an embodiment of the invention.

FIG. 2 is an exemplary timing diagram 200 illustrating standby NORMAL power level operation and LOW power level operation of an exemplary multistandard wireless communication system, in accordance with an embodiment of the invention. Referring to FIG. 2, graph 202 may represent a timing diagram of power consumption within a multistandard wireless communication system, such as the multistandard wireless communication system 102 of FIG. 1B, prior to reducing regulator output voltage and/or regulator current during sleep mode of operation.

For example, during time periods [0--t1], [t2-t3], and after time instant t4, the multistandard wireless communication system may be operating in sleep mode. In one aspect of the invention, each of the time periods of sleep mode of operation may be 2 seconds in duration. During idle time of standby mode of operation, all the main clocks within the multistandard wireless communication system may be disabled and only real-time clocks may be enabled to keep a sleep timer, for example, powered ON. In addition, power P1 may be consumed by the multistandard wireless communication system during sleep mode of operation.

At time instants t1 and t3, the multistandard wireless communication system may wake-up and may switch from sleep to normal mode of operation. In an exemplary aspect of the invention, normal mode of operation may last for approximately 30 ms, for example, during time periods [t1–t2] and [t3–t4].

In another embodiment of the invention, power consumption within the multistandard wireless communication system may be further reduced, as illustrated by graph 204, by reducing the regulator output voltage supplied by the system power supply and/or by reducing regulator current. For example, during time periods [0–t1], [t2–t3], and after time instant t4, the multistandard wireless communication system may be operating in sleep mode, with reduced regulator output voltage. In one aspect of the invention, each of the time periods of sleep mode of operation may be 2 seconds in duration.

During idle time of standby mode of operation, all the main clocks within the multistandard wireless communication system may be disabled and only real-time clocks may be enabled to keep a sleep timer, for example, powered ON. As a result of the reduced power supply voltage and/or reduced regulator current, power P2 may be consumed by the multistandard wireless communication system during sleep mode of operation. In this regard, a total saving of (P2-P1) may be achieved within the multistandard wireless communication system by reducing the power supply output voltage and/or by reducing regulator module current during standby mode of operation.

Figure 3:
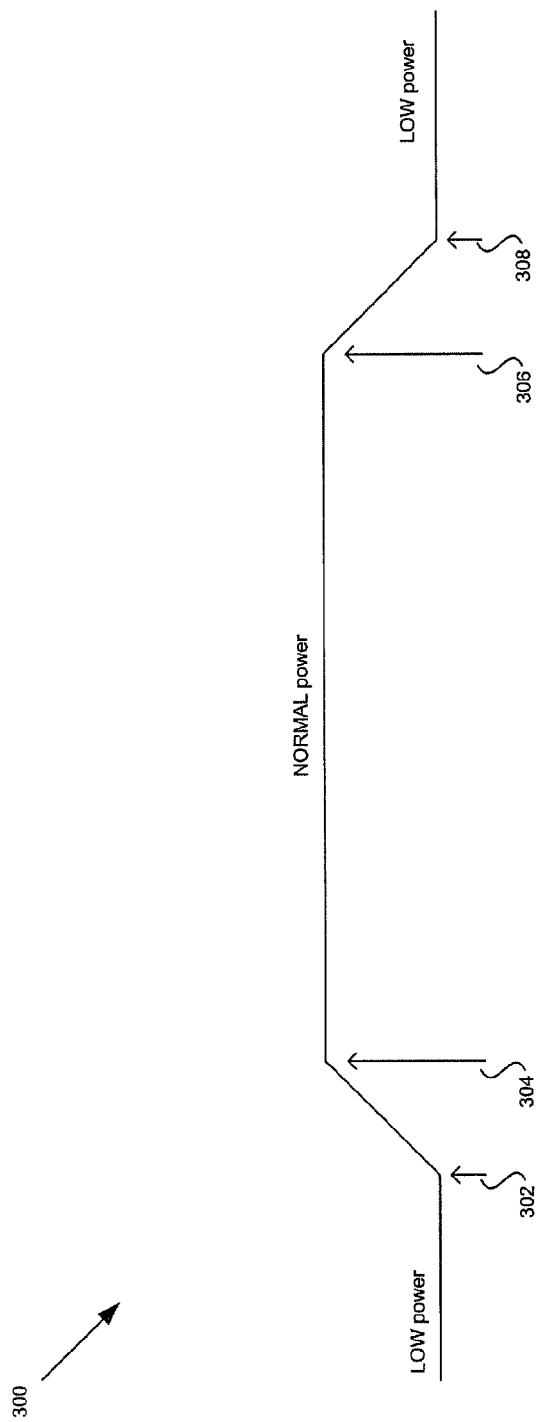
FIG. 3 is an exemplary timing diagram illustrating a LOW-NORMAL-LOW transition in operating power within an exemplary multistandard wireless communication system, in accordance with an embodiment of the invention.

FIG. 3 is an exemplary timing diagram 300 illustrating a LOW-NORMAL-LOW transition in operating power within an exemplary multistandard wireless communication system, in accordance with an embodiment of the invention. Referring to FIG. 3, at 302, a multistandard wireless communication system, such as the multistandard wireless communication system 102 of FIG. 16, may de-assert a sleep signal supplied by a sleep timer, for example, to switch from sleep to normal operating mode. At 304, a power supply within the multistandard wireless communication system may supply NORMAL power level voltage to devices within the multistandard wireless communication system thus initiating normal operating mode. The time period between 302 and 304 may represent a settling time for the multistandard wireless communication system. In an exemplary aspect of the invention, the settling time may be programmable.

At 306, the sleep timer within the multistandard wireless communication system may communicate a sleep signal to the power supply. The power supply may then switch to LOW power mode voltage output, concluding the wake-up, or normal, operating mode. After a settling time represented by the time interval between 306 and 308, at 308, the multistandard wireless communication system initiates operation in sleep Mode.

Figure 4:
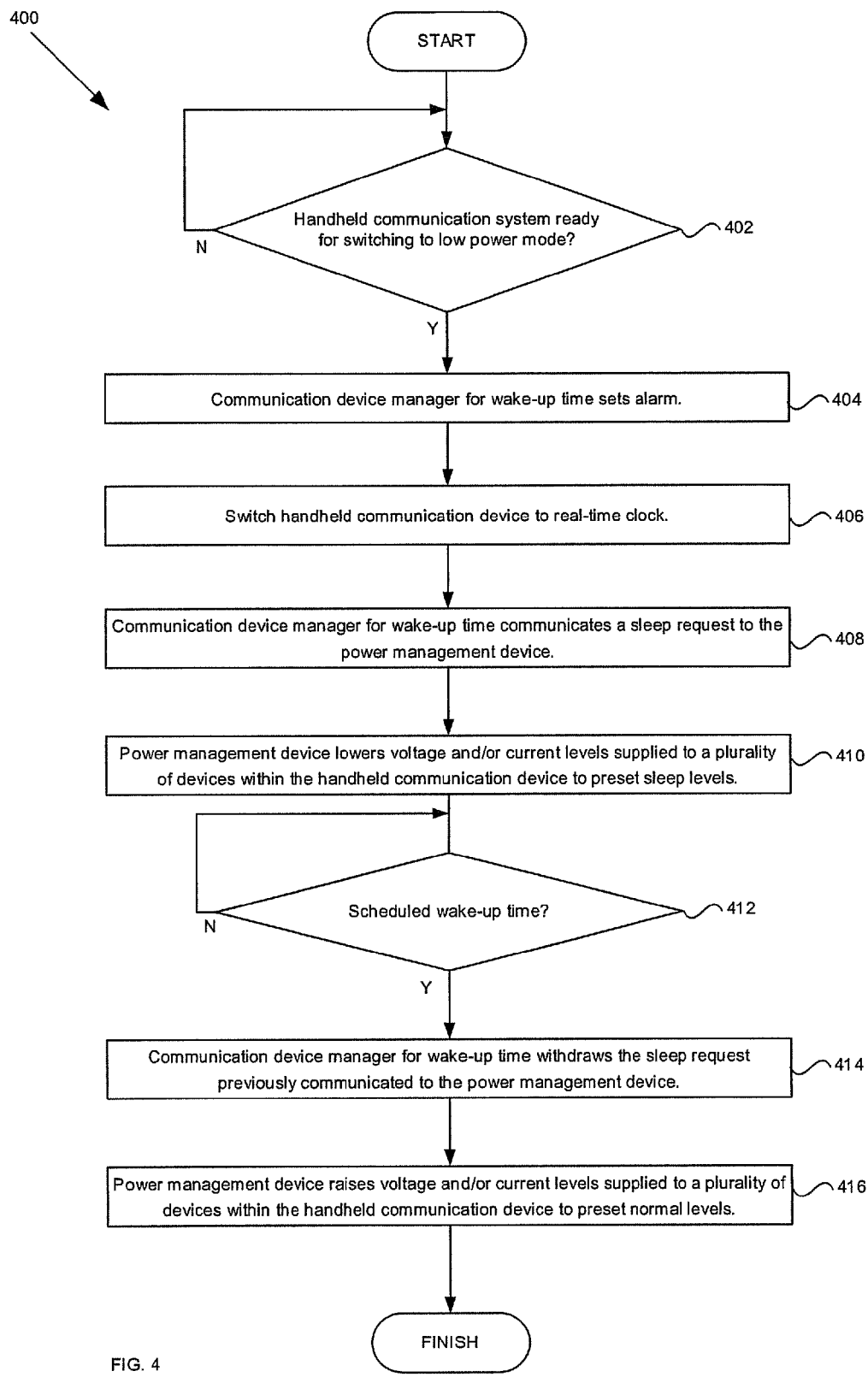
FIG. 4 is a flow diagram illustrating exemplary steps for a NORMAL-LOW-NORMAL transition in operating power within an exemplary multistandard wireless communication system, in accordance with an embodiment of the invention.

FIG. 4 is a flow diagram 400 illustrating exemplary steps for a NORMAL-LOW-NORMAL transition in operating power within an exemplary multistandard wireless communication system, in accordance with an embodiment of the invention. Referring to FIG. 4, at 402, it may be determined whether the exemplary multistandard wireless communication system is ready for switching to low power mode of operation. If the multistandard wireless communication system is ready for switching to low power mode of operation, at 404, a communication device manager may set an alarm. At 406, the multistandard wireless communication system may be switched to a real-time clock. At 408, the communication device manager may communicate a sleep request to the power management device within the multistandard wireless communication system.

At 410, the power management device may lower output voltage supplied to a plurality of devices within the multistandard wireless communication system to preset sleep levels. At 412, it may be determined whether scheduled wake-up time has occurred. If it is determined that scheduled wake-up time has occurred, at 414, the communication device manager for wake-up time may withdraw the sleep request previously communicated to the power management device. Upon detecting that the sleep request is withdrawn, at 416, the power management device may raise regulator current and/or voltage supplied to the plurality of devices within the multistandard wireless communication system to preset normal operating levels.

Figure 5:
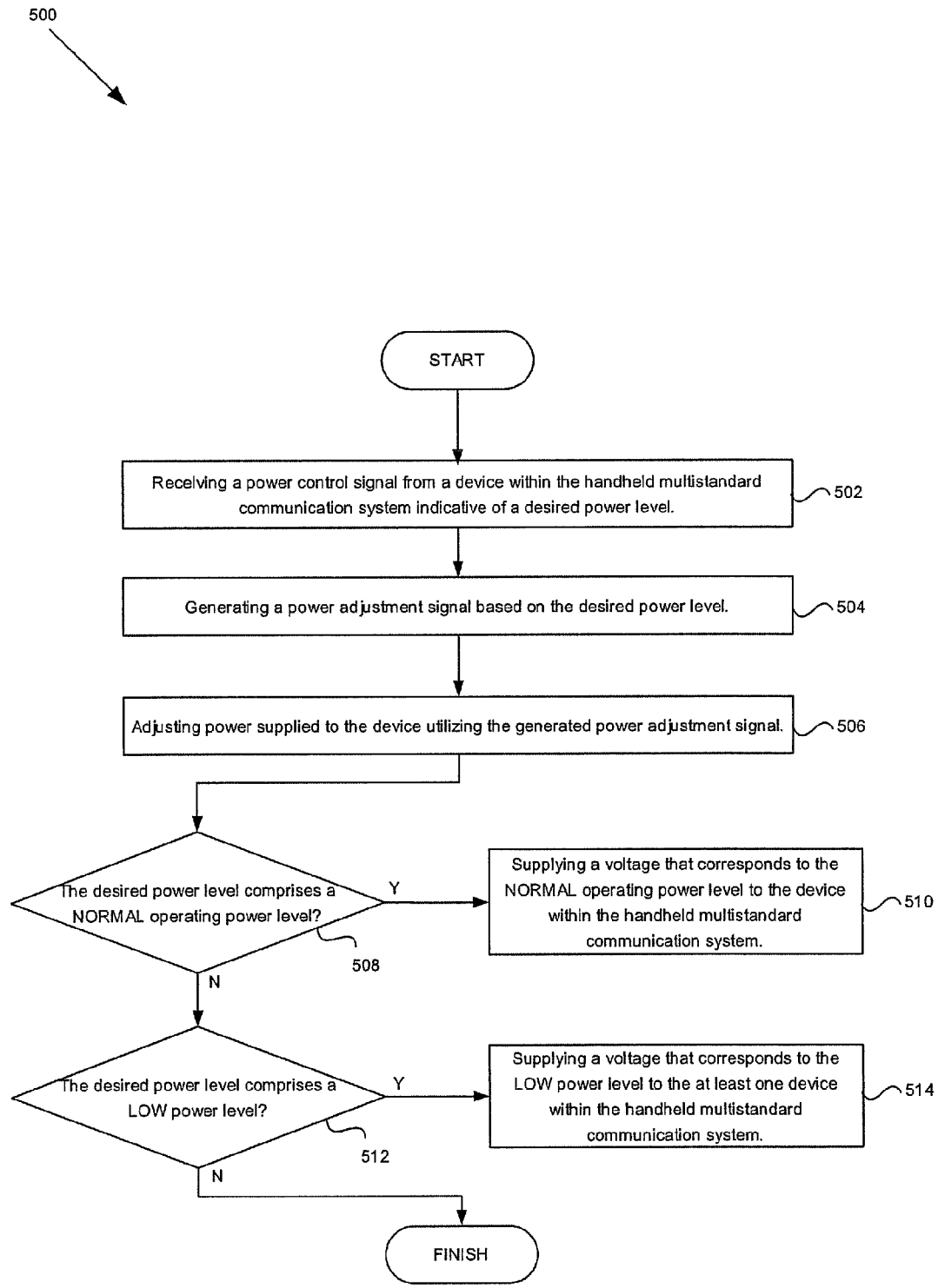
FIG. 5 is a flow diagram illustrating exemplary steps for managing power consumption within an exemplary multistandard wireless communication system, in accordance with an embodiment of the invention.

FIG. 5 is a flow diagram 500 illustrating exemplary steps for managing power consumption within an exemplary multistandard wireless communication system, in accordance with an embodiment of the invention. Referring to FIG. 5, at 502, a power control signal may be received from a device within a handheld multistandard communication system indicative of a desired power level. At 504, a power adjustment signal may be generated based on the desired power level. At 506, power supplied to the device within the handheld multistandard communication system may be adjusted utilizing the generated power adjustment signal. At 508, it may be determined whether the desired power level comprises a NORMAL operating power level. If the desired power level comprises a NORMAL operating power level, at 510, a voltage that corresponds to the NORMAL operating power level may be supplied to the device within the handheld multistandard communication system. At 512, it may be determined whether the desired power level comprises a LOW power level. If the desired power level comprises a LOW power level, at 514, a voltage that corresponds to the LOW power level may be supplied to the device within the handheld multistandard communication system.

Another embodiment of the invention may provide a machine-readable storage, having stored thereon, a computer program having at least one code section for managing power consumption within the handheld multistandard communication system 102. The at least one code section may be executable by a machine to perform a plurality of steps as described herein. For example, code may be provided to receive a power setting signal 129 from a control device 114 within the handheld multistandard communication system 102, indicative of a desired power level setting. Code may be provided for adjusting power supplied to one or more devices within the handheld multistandard communication system 102 in accordance with the power setting signal 129. Code may be provided for acquiring the power setting signal 129, which is indicative of the desired power level setting. Code may be provided for limiting a current to one or more of the regulators within the power supply 116 based on the desired power level setting.

Accordingly, aspects of the invention may be realized in hardware, software, firmware or a combination thereof. The invention may be realized in a centralized fashion in at least one computer system or in a distributed fashion where different elements are spread across several interconnected computer systems. Any kind of computer system or other apparatus adapted for carrying out the methods described herein is suited. A typical combination of hardware, software and firmware may be a general-purpose computer system with a computer program that, when being loaded and executed, controls the computer system such that it carries out the methods described herein.

One embodiment of the present invention may be implemented as a board level product, as a single chip, application specific integrated circuit (ASIC), or with varying levels integrated on a single chip with other portions of the system as separate components. The degree of integration of the system will primarily be determined by speed and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor may be implemented as part of an ASIC device with various functions implemented as firmware.

The present invention may also be embedded in a computer program product, which comprises all the features enabling the implementation of the methods described herein, and which when loaded in a computer system is able to carry out these methods. Computer program in the present context may mean, for example, any expression, in any language, code or notation, of a set of instructions intended to cause a system having an information processing capability to perform a particular function either directly or after either or both of the following: a) conversion to another language, code or notation; b) reproduction in a different material form. However, other meanings of computer program within the understanding of those skilled in the art are also contemplated by the present invention.

While the invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A method for managing operation of a device, the method comprising:
   performing using one or more processors and/or circuits in a handheld device, said one or more processors and/or circuits comprising a control device and one or more other devices:
   receiving from said control device, one or more power setting signals indicative of a desired power level setting, wherein said handheld device operates utilizing a NORMAL power level setting in a normal mode, or a standby power level setting in standby mode, and wherein said standby power level setting comprises a LOW power level setting and a sleep mode setting;
   generating one or more corresponding power adjustment signals based on said received one or more power setting signals; and
   adjusting power supplied to said handheld device based on said generated one or more corresponding power adjustment signals, wherein said power supplied to said handheld device when said handheld device is in said LOW power level setting, is reduced to a level that is below that which is normally utilized for said normal mode.

2. The method according to claim 1, comprising configuring said handheld device to operate utilizing said adjusted power.

3. The method according to claim 1, wherein said power supplied to said handheld device corresponds to one of a plurality of power level settings.

4. The method according to claim 3, wherein said plurality of power level settings comprises said NORMAL power level setting and said LOW power level setting.

5. The method according to claim 1, wherein said generated one or more corresponding power adjustment signals controls said power supplied to said handheld device.

6. The method according to claim 1, comprising, if said desired power level setting comprises said NORMAL power level setting, supplying a voltage that corresponds to said NORMAL power level setting to said handheld device.

7. The method according to claim 1, comprising, if said desired power level setting comprises said LOW power level setting, supplying a voltage that corresponds to said LOW power level setting to said handheld device.

8. The method according to claim 1, comprising, if a present power level setting is said NORMAL power level setting and said desired power level setting comprises said LOW power level setting, switching power supplied to said handheld device from said NORMAL power level setting to said LOW power level setting based on said one or more corresponding power adjustment signals.

9. The method according to claim 1, comprising, if a present power level setting is said LOW power level setting and said desired power level setting comprises said NORMAL power level setting, switching a power supplied to said handheld device from said LOW power level setting to said NORMAL power level setting based on said one or more corresponding power adjustment signals.

10. The method according to claim 1, comprising, if said handheld device is switched to a desired LOW power level setting, clocking said control device and/or said one or more other devices utilizing one or more real-time clock signals.

11. The method according to claim 1, comprising acquiring said one or more power setting signal indicative of said desired power level setting from said control device and/or said one or more other devices.

12. The method according to claim 1, comprising limiting a current to said control device and/or said one or more other devices based on said desired power level setting.

13. A system for managing operation of a device, the system comprising:
   one or more processors and/or circuits in a handheld device, said one or more processors and/or circuits comprising a control device and one or more other devices, wherein said one or more processors and/or circuits are operable to:
   receive from said control device, one or more power setting signals indicative of a desired power level setting, wherein said handheld device operates utilizing a NORMAL power level setting in a normal mode, or a standby power level setting in standby mode, and wherein said standby power level setting comprises a LOW power level setting and a sleep mode setting;
   generate one or more corresponding power adjustment signals based on said received one or more power setting signals; and
   adjust power supplied to said handheld device based on said generated one or more corresponding power adjustment signals, wherein said power supplied to said handheld device when said handheld device is in said LOW power level setting, is reduced to a level that is below that which is normally utilized for said normal mode.

14. The system according to claim 13, wherein said one or more processors and/or circuits are operable to configure said handheld device to operate utilizing said adjusted power.

15. The system according to claim 13, wherein said power supplied to said handheld device corresponds to one of a plurality of power level settings.

16. The system according to claim 15, wherein said plurality of power level settings comprises said NORMAL power level setting and said LOW power level setting.

17. The system according to claim 13, wherein said generated one or more corresponding power adjustment signals controls said power supplied to said handheld device.

18. The system according to claim 13, wherein said one or more processors and/or circuits are operable to supply a voltage that corresponds to said NORMAL power level setting to said handheld device, when said desired power level setting comprises said NORMAL power level setting.

19. The system according to claim 13, wherein said one or more processors and/or circuits are operable to supply a voltage that corresponds to said LOW power level setting to said handheld device, when said desired power level setting comprises said LOW power level setting.

20. The system according to claim 13, wherein said one or more processors and/or circuits are operable to switch power supplied to said handheld device from said NORMAL power level setting to said LOW power level setting based on said one or more corresponding power adjustment signals, when a present power level setting is said NORMAL power level setting and said desired power level setting comprises said LOW power level setting.

21. The system according to claim 13, wherein said one or more processors and/or circuits are operable to switch a power supplied to said handheld device from said LOW power level setting to said NORMAL power level setting based on said one or more corresponding power adjustment signals, when a present power level setting is said LOW power level setting and said desired power level setting comprises said NORMAL power level setting.

22. The system according to claim 13, wherein said one or more processors and/or circuits are operable to clock said control device and/or said one or more other devices utilizing one or more real-time clock signals, when said handheld device is switched to a desired LOW power level setting.

23. The system according to claim 13, wherein said one or more processors and/or circuits are operable to acquire said one or more power setting signals indicative of said desired power level setting from said handheld device.

24. The system according to claim 13, wherein said one or more processors and/or circuits are operable to limit a current to said handheld device based on said desired power level setting.

25. A method for managing power consumption within a handheld device, the method comprising:

receiving at least one power setting signal from a control device within the handheld device indicative of a desired power level setting, wherein the handheld device is configured to operate at a NORMAL power level setting in a normal mode, or a standby power level setting in standby mode, and wherein said standby power level setting comprises a LOW power level setting and a sleep mode setting; and in accordance with said at least one power setting signal, adjusting power supplied to at least one device within the handheld device utilizing a power adjustment signal, wherein power supplied to said at least one device when said handheld device is in said LOW power level setting is reduced to a level that is below that which is normally utilized for said normal mode.

26. The method according to claim 25, comprising, if a present power level setting is said NORMAL power level setting and said desired power level setting comprises said LOW power level setting, switching power supplied to said at least one device within the handheld device from said NORMAL power level setting to said LOW power level setting based on said at least one power adjustment signal.

27. The method according to claim 25, comprising, if a present power level setting is said LOW power level setting and said desired power level setting comprises said NORMAL power level setting, switching power supplied to said at least one devices within the handheld device from said LOW power level setting to said NORMAL power level setting based on said at least one power adjustment signal.

* * * * *